(12) United States Patent
Wang et al.

(10) Patent No.: US 11,238,274 B2
(45) Date of Patent: Feb. 1, 2022

(54) IMAGE FEATURE EXTRACTION METHOD FOR PERSON RE-IDENTIFICATION

(71) Applicant: Peking University Shenzhen Graduate School, Shenzhen (CN)

(72) Inventors: Wenmin Wang, Shenzhen (CN); Yihao Zhang, Shenzhen (CN); Ronggang Wang, Shenzhen (CN); Ge Li, Shenzhen (CN); Shengfu Dong, Shenzhen (CN); Zhenyu Wang, Shenzhen (CN); Ying Li, Shenzhen (CN); Wen Gao, Shenzhen (CN)

(73) Assignee: Peking University, Beijing (CN)

( * ) Notice: Subject to any disclaimer, the term of this patent is extended or adjusted under 35 U.S.C. 154(b) by 272 days.

(21) Appl. No.: 16/622,586

(22) PCT Filed: Dec. 27, 2017

(86) PCT No.: PCT/CN2017/118794
§ 371 (c)(1),
(2) Date: Dec. 13, 2019

(87) PCT Pub. No.: WO2019/007004
PCT Pub. Date: Jan. 10, 2019

(65) Prior Publication Data
US 2021/0150194 A1 May 20, 2021

(30) Foreign Application Priority Data
Jul. 4, 2017 (CN) .......................... 201710536020.4

(51) Int. Cl.
*G06K 9/00* (2006.01)
*G06K 9/62* (2006.01)
(Continued)

(52) U.S. Cl.
CPC ....... *G06K 9/00362* (2013.01); *G06K 9/6215* (2013.01); *G06K 9/6232* (2013.01); *G06K 9/6261* (2013.01); *G06N 20/00* (2019.01)

(58) Field of Classification Search
None
See application file for complete search history.

(56) References Cited

U.S. PATENT DOCUMENTS

2018/0373929 A1* 12/2018 Ye .................. G06K 9/00771
2018/0373962 A1* 12/2018 Ye .................. G06K 9/00369
(Continued)

FOREIGN PATENT DOCUMENTS

CN 102663409 A * 9/2012
CN 105005760 A * 10/2015
(Continued)

OTHER PUBLICATIONS

Farenzena et al., Person Re-Identification by Symmetry-Driven Accumulation of Local Features, IEEE Computer Society Conference on Computer Vision and Pattern Recognition, (Year: 2010).*

*Primary Examiner* — Mohammed Rachedine
(74) *Attorney, Agent, or Firm* — SV Patent Service (57) ABSTRACT

An image feature extraction method for person re-identification includes performing person re-identification by means of aligned local descriptor extraction and graded global feature extraction; performing the aligned local descriptor extraction by processing an original image by affine transformation and performing a summation pooling operation on image block features of same regions to obtain an aligned local descriptor; reserving spatial information between inner blocks of the image for the aligned local descriptor; and performing the graded global feature extraction by grading a positioned pedestrian region block and solving a corresponding feature mean value to obtain a global feature. The method can resolve the problem of
(Continued)

feature misalignment caused by posture changes of pedestrian, etc., and eliminate the effect of unrelated backgrounds on re-recognition, thus improving the precision and robustness of person re-identification.

10 Claims, 3 Drawing Sheets

(51) Int. Cl.
*G06K 9/46* (2006.01)
*G06K 9/56* (2006.01)
*G06N 20/00* (2019.01)

(56) References Cited

U.S. PATENT DOCUMENTS

2020/0005490 A1* 1/2020 Paik ................ G06K 9/00771
2020/0218904 A1* 7/2020 Olmeda Reino .. G06K 9/00778

FOREIGN PATENT DOCUMENTS

| CN | 107832672 A | * | 3/2018 | |
|----|----|----|----|----|
| CN | 107886067 A | * | 4/2018 | |
| CN | 110147743 A | * | 8/2019 | |
| WO | WO-2017190656 A1 | * | 11/2017 | ............... G06K 9/00 |

* cited by examiner

IMAGE FEATURE EXTRACTION METHOD FOR PERSON RE-IDENTIFICATION

TECHNICAL FIELD

The present invention relates to the field of computer vision and image processing technology, and specifically, to an image robustness feature extraction method for person re-identification.

BACKGROUND OF THE INVENTION

In recent years, with the increasing demand for social public safety, video surveillance systems have become more popular. How to use computer vision analysis technology to automatically monitor and analyze video information has become focus. Person re-identification is a key task in computer vision research. In general, with a given image or a video about a pedestrian, person re-identification is the process of identifying the same person in other images or videos that do not coincide with the shooting scene. Although more attention has been paid on related research, and the precision of person re-identification has been improved, there are still many difficulties to be overcome, e.g., changes in posture, illumination and the influence of unrelated backgrounds.

The current traditional person re-identification framework mainly consists of two parts: feature extraction and metric learning. However, in most of the current methods in the process of extracting image features, the influence of unrelated background information is ignored, so the extracted image features have more noise; second, to solve the problem of change due to different shooting angles and posture, most of the methods adopt a non-exact matching strategy, and uses a specific method to merge the features between different image blocks. The effect is quite significant, but meanwhile some spatial information in the image is lost, and the re-recognition ability on some images with relative position difference is reduced.

SUMMARY OF THE INVENTION

To overcome the above deficiencies of prior art, the present invention proposes an image feature extraction method for person re-identification. A new aligned local descriptor is proposed and designed under an exact matching strategy based on image color and texture features. The graded global feature is designed to complement each other to solve the problem of feature misalignment caused by pedestrian posture changes, etc., and improve the precision of person re-identification.

The principle of the present invention is to propose an aligned local descriptor and a graded global feature extraction algorithm for person re-identification. The present invention proposes the aligned local descriptor based on the exact matching strategy for the defects caused by the inexact matching strategy in the existing feature extraction method, and proposes the graded global feature in order to eliminate the effect of unrelated backgrounds, thus improving the precision of person re-identification by the aligned local descriptor and the graded global feature extraction. Spatial information between inner blocks of the image is reserved by the aligned local descriptor. At the same time, to solve the problem of misalignment between images, an original image is processed by affine transformation, and four horizontal flip and shear images (including the original image) are obtained; and by superimposing, a summation pooling operation is performed on image block features of adjacent regions to obtain an aligned local descriptor. To enrich the expression of image features and eliminate the effect of background information, the global features of the pedestrian's overall contour region and its head, the upper body and the lower body are calculated respectively, and finally the graded global feature are integrated. Experiments show that the aligned local descriptor and the graded global feature can help to solve the problem of posture changes and weaken the effect of background, and the reserved internal spatial information of the image also contributes to improving the precision of pedestrian matching.

The aligned local descriptor is a feature proposed based on the exact matching strategy. That is, for blocks inside the image, the corresponding color and texture features are extracted, the position information of image block is reserved, and they are not merged with the features of other blocks in the image. To solve the problem of misalignment between two images caused by pedestrian posture changes, the original image is processed by affine transformation, such as horizontal flip and horizontal shear, to obtain expanded images of four different angles of the same image. Then, the four images are spatially superimposed, and based on the features of image block, the image block features of the same image region are subject to a summation pooling operation as the final descriptor of image block. The graded global feature is proposed based on the complementary roles of local features. The traditional global feature is to count the corresponding color and texture information for the whole image. The extracted global features often contain a large amount of background information, and the spatial information is disordered. For images with large structural differences but consistent statistical information, it is very easy to cause error. The graded global feature not only considers the effect of the background, but also groups the image blocks of pedestrian area according to the head, upper body and lower body, and further divides the upper body covering important information into three levels, which enhances the global feature identification capacity.

The technical scheme proposed in the present invention:

An image feature extraction method for person re-identification includes the one or more of the following steps: performing person re-identification by means of aligned local descriptor extraction and graded global feature extraction; performing the aligned local descriptor extraction by processing an original image by affine transformation and performing a summation pooling operation only on image block features of adjacent regions to obtain an aligned local descriptor; reserving spatial information between inner blocks of the image for the aligned local descriptor; and performing the graded global feature extraction by grading a positioned pedestrian region block and solving a corresponding feature mean value to obtain a global feature, including the following steps:

1) pre-processing the image to eliminate the effect of illumination on the image; In order to eliminate the effect of illumination on the image, the present invention adopts a multi-scale Retinex algorithm to preprocess the image; when removing the background information, the foreground extraction method for performing significance detection by the cellular automaton is used; and for expression of image blocks, three color space histograms (nRGB, Lab and HSV) are used, and a statistical histogram of Scale-Invariant Local Three-valued Pattern (SILTP) is adopted for the texture information.

2) extracting the aligned local descriptor, mainly comprising the steps of:
   21) performing affine transformation on the image to obtain multiple images (including the original image and the transformed image);
   22) separately performing image block segmentation on each image obtained in the previous step, extracting features, and generating corresponding feature image;
   23) superimposing all the feature maps in space, performing a summation pooling operation on the image block features of the adjacent positions, and obtaining corresponding local descriptors; and
   24) connecting them in order from upper left to lower right according to the position of the local descriptor in the image to obtain an aligned local descriptor;
3) extracting graded global feature, mainly comprising the steps of:
   31) using the foreground extraction method to perform significance detection on the image to obtain a corresponding significance image;
   32) enhancing the contrast of significance image obtained in the previous step;
   33) locating image blocks of the pedestrian area;
   34) classifying the image blocks of the pedestrian according to three different levels for the special structure of human body;
   35) performing an average pooling operation on each level of the image block to obtain features of the level; and
   36) connecting the three-level features from first to last, and obtaining graded global feature; and
4) calculating the similarity of the images according to the aligned local descriptor extracted in Step 2) and the graded global feature extracted in Step 3) by using the existing XQDA (Cross-view Quadratic Discriminant Analysis) method as the metric learning method, thereby performing person re-identification.

Compared with the prior art, the beneficial effects of the present invention are as follows:

The present invention provides a person re-identification method. By means of aligned local descriptor extraction, the spatial information between partial blocks of the image is reserved, and the problem of feature misalignment caused by posture changes of pedestrian can be resolved; by means of graded global feature extraction, the effect of unrelated backgrounds is eliminated; and the precision and robustness of person re-identification are improved by combining the extracted aligned local descriptor and the graded global feature. Specifically, the present invention has the following advantages:

I. The relative position information of unrelated image blocks is reserved in the method of the present invention, which is often ignored in the feature extraction process in the existing person re-identification method. In the present invention, the relative position information of the unrelated image blocks is added to improve the precision of subsequent matching;

II. The input image is processed by affine transformation in the method of the present invention, and the problem of feature misalignment caused by posture changes of pedestrian or different shooting angle can be resolved to a certain extent; and III. The global feature is extracted by using multiple levels of pedestrian area image blocks in the method of the present invention, thus improving the robustness of global feature.

DETAILED DESCRIPTION OF THE INVENTION

The present invention will become apparent from the following detailed description of embodiments and from the accompanying drawings, but not limited to the scope of the invention in any way.

The present invention proposes the aligned local descriptor and the graded global feature based on the exact matching strategy subject to the defects caused by the inexact matching strategy in the existing image feature extraction method. Spatial information between inner blocks of the image for the aligned local descriptor is reserved. At the same time, to solve the problem of misalignment between images, an original image is processed by affine transformation, and four horizontal flip and shear images (including the original image) are obtained; and by superimposing, a summation pooling operation is performed on image block features of the same regions to obtain an aligned local descriptor. To enrich the expression of image features, the global features of the pedestrian's overall contour region and his/her head, the upper body and the lower body are calculated respectively, and finally the graded global feature is integrated. Experiments show that the aligned local descriptor and the graded global feature can help to solve the problem of posture changes, and the reserved internal spatial information of the image also contributes to improving the precision of pedestrian matching.

Figure 1:
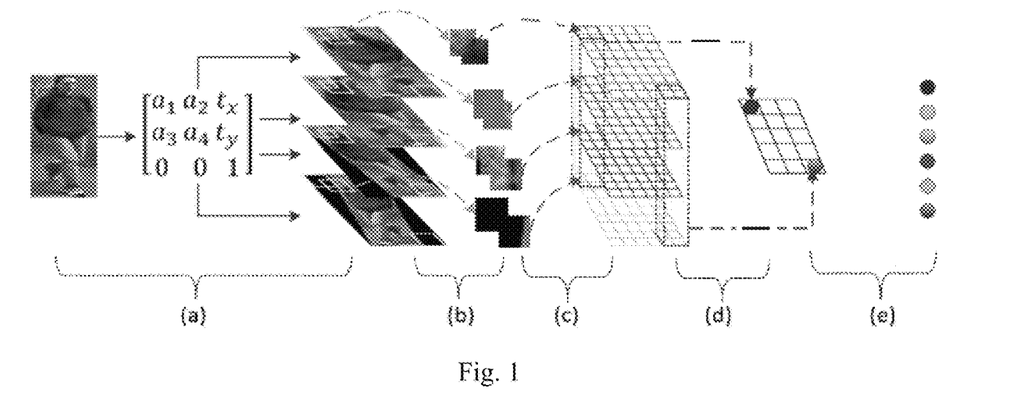
FIG. 1 is a schematic diagram for the aligned local descriptor extraction process, wherein, in (a) an affine transformation (horizontal shear and horizontal flip) of the original image is performed, and four transformed images are obtained respectively; in (b) a feature extraction process of image blocks is performed for each image separately; in (c) the four feature images are superimposed spatially; in (d) a summation pooling operation is performed on the features of the adjacent image blocks to obtain a plurality of local descriptors; and in (e) each local descriptor vector is connected to obtain the final aligned local descriptor.

FIG. 1 shows the extraction process of the aligned local descriptor. First the affine transformation is made, then extraction of image block features is made, then a summation pooling operation on feature vectors of adjacent image blocks is performed, and finally different local descriptors are connected together as an aligned local descriptor of the image. In the specific embodiment of the present invention, the aligned local descriptor extraction process can include the following steps:

1. Uniformly scaling the image is to the size of 128*48, using the multi-scale Retinex algorithm described in Literature [1] (D. J. Jobson, Z.-U. Rahman, and G. A. Woodell. A multiscale retinex for bridging the gap between color images and the human observation of scenes. Image Processing, IEEE Transactions on, 6(7):965-976, 1997) to eliminate the illumination effect, and obtaining the pre-processed image I. Wherein, the multi-scale Retinex algorithm is based on the consistency of color perception (color constancy), and it is considered that the image seen by the observer is obtained from reflecting incident light L by the surface of the object, and the reflectivity R is determined by the object itself, but not affected by changes in incident light L. Therefore, the image enhancement effect can be achieved by removing the luminance component L to obtain the reflection component R. In addition, the luminance component can be obtained by Gaussian convolution of the image, and σ is a scale parameter of Gaussian function. If a single scale is used, when the value is large, the color distortion is small but the detail recovery is poor; and when the value is small, the detail recovery is good but the color distortion is large. Therefore, weighted summation is performed by using a variety of scale parameters. The scale parameters in this experiment are σ=5 and σ=20, respectively;

2. Affine transformation. The pre-processed image I is horizontally flipped to obtain image II, the images I and II are horizontally shear-transformed respectively to generate corresponding images III and IV, and the horizontal shear transformation is as shown in Equation 1:

$$\begin{bmatrix} x' \\ y' \\ 1 \end{bmatrix} = \begin{bmatrix} 1 & 0 & 0 \\ \lambda & 1 & 0 \\ 0 & 0 & 1 \end{bmatrix} \begin{bmatrix} x \\ y \\ 1 \end{bmatrix} \quad (1)$$

where λ is the shear transformation parameter, and λ=0.2 is used in the present method;

3. Obtaining the features of image blocks for the four images (I, II, III, and IV) obtained in the previous step.

Specifically, the sliding window method is used to extract 8*8*8-dimensional nRGB and HSV color histograms, 32-dimensional Lab color histogram, and two statistical histograms of Scale-Invariant Local Three-valued Pattern (SILTP) with a threshold of 0.3. The comparison radius R of the two SILTPs is 3 and 5 pixels respectively, wherein the size of sliding window is 8*8 and the step is 4*4. N image blocks can be obtained for each image through the sliding window in the same horizontal direction, and M image blocks are obtained in the same vertical direction. The corresponding features are extracted to obtain a feature map, wherein there are M*N points, and each point corresponds to a feature vector of one image block, which is denoted as $F_{m,n}^i$.

In the above sliding window method, nRGB is used to change the pixel (originally 0-255) of each channel in the original RGB three-channel color image to the specified range of 0-8, and 8*8*8 means scaling each channel to 0-8, and further obtaining the corresponding color histogram.

The comparison radius R refers to the comparison of the target element point with the pixel R pixels far away from it;

4. Superimposing four feature vector maps in space, and performing a summation pooling operation on image block features of adjacent positions to obtain the corresponding local descriptor, as shown in Equation 2:

$$\widetilde{F_{p,q}} = \sum_{i=1}^{4} (F_{m,n}^i + F_{m+1,n}^i + F_{m,n+1}^i + F_{m+1,n+1}^i) \quad (2)$$

where $$m = 2 \times (p-1) + 1, n = 2 \times (q-1) + 1, p \leq \left\lfloor \frac{M}{2} \right\rfloor, q \leq \left\lfloor \frac{N}{2} \right\rfloor,$$

where $F_{m,n}^i$ denotes image block feature vectors of the $m^{th}$ row and the $n^{th}$ column in the $i^{th}$ feature map, the adjacent 16 image block feature vectors are added, and the obtained $\widetilde{F_{p,q}}$ denotes a local descriptor, where p and q are positive integers, respectively representing the location of the local descriptor; and 5. Finally, connecting all local descriptors end to end in a sequence from top left to bottom right according to the position of all the local descriptors in the feature map to form a feature vector as the aligned local descriptor of the whole image.

Figure 2:
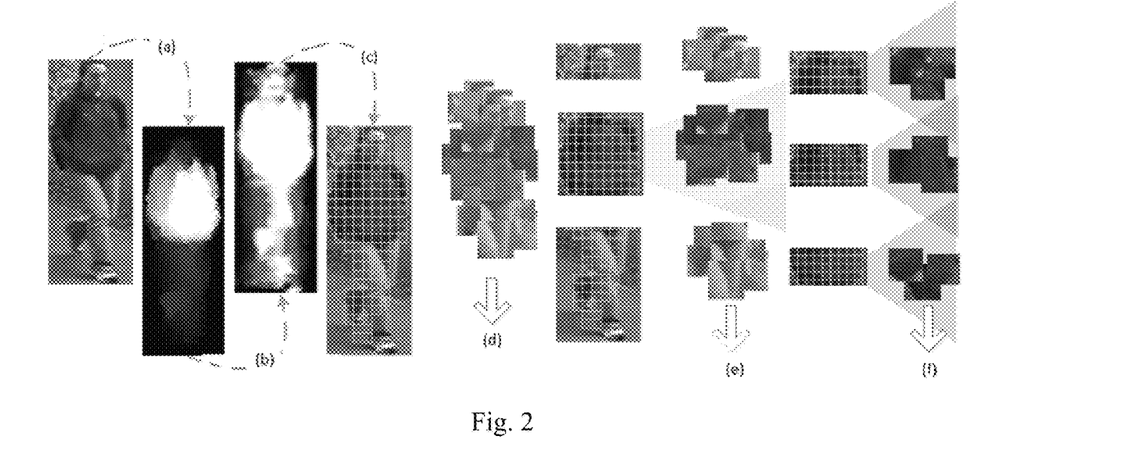
FIG. 2 is a schematic diagram for the graded global feature extraction process, wherein, in (a) significance detection is performed on the image to obtain a significance image; in (b) the contrast of significance image is enhanced; in (c) the image blocks of the pedestrian area is located; in (d) the first level of global feature extraction is performed for all image block features of the pedestrian; in (e) the image block of the pedestrian is divided into three parts: the head, the upper body and the lower body, to extract the second level of global feature; and in (f) all image blocks of the upper body of pedestrian are divided into three parts to extract the third level of global feature.

FIG. 2 illustrates the graded global feature extraction process. First, significance detection is performed on the image, then the contrast is enhanced for the element values in the same horizontal direction, then the image is binarized, and the pedestrian area block is located by sliding the window. The pedestrian area block is graded to obtain the corresponding feature mean. Specifically, the graded global feature extraction process can include the following steps:

1. Uniformly scaling the image to the size of 128*48, and using the multi-scale Retinex algorithm described in Literature [1] (D. J. Jobson, Z.-U. Rahman, and G. A. Woodell. A multiscale retinex for making up the gap between color images and the human observation of scenes. Image Processing, IEEE Transactions on, 6(7):965-976, 1997) to eliminate the illumination effect, where the scale parameters are σ=5 and σ=20, respectively;

2. Using the method described in Literature [2] (Y. Qin, H. Lu, Y. Xu, and H. Wang, "Saliency detection via cellular automata," in Computer Vision and Pattern Recognition (CVPR), 2015, pp. 110-119) to extract the foreground image from the pre-processed image to obtain the corresponding significance image. A background-based map is first created by using color and spatial contrast in this method. Then, a new propagation mechanism that relies on cellular automata is used, and the intrinsic correlation of similar regions is explored through interaction with neighborhoods. The influence factor matrix and the consistency matrix are constructed to balance the effect of each unit's next state. The significance values of all cells are updated simultaneously according to the update rules;

3. Enhancing the contrast of extracted significance images by using Equation 3:

$$p'_{r,i} = \left\lfloor \frac{p_{r,i}}{\max(p_{r,j=1,2...n}) - \min(p_{r,j=1,2...n})} \times 255 \right\rfloor \quad (3)$$

where numerator $p_{r,i}$ is the element value of $i^{th}$ column of $r^{th}$ row, and the denominator is the extreme difference of the element of the row. After obtaining the $p_{r,i}'$ value of element of each column of the row, the elements of the row are uniformly updated;

4. Adaptively selecting the threshold by using the OTSU algorithm described in Literature [3] (N. Otsu, "Threshold selection method from gray-level histograms, IEEE transactions on systems man and cybernetics," Systems Man & Cybernetics IEEE Transactions on, vol. 9, no. 1, pp. 62-66, 1979), and binarizing the result obtained in the previous step to obtain a corresponding binary image. Where the OTSU algorithm divides the gray degree of the image into two parts according to the gray level, so that the difference of the gray value between the two parts is the largest, and the difference of the gray value between each part is the smallest. A suitable gray level is used for dividing via the variance calculation. So the OTSU algorithm can be used in the binarization to automatically select the threshold for binarization;

5. Scanning the binary image by sliding window. The window size is 10*10 and the step is 5*5. The values of the elements in the window are summed, where the window larger than the set threshold (e.g., 50) is defined as a pedestrian area, and others are unrelated areas;

6. Extracting color and texture features for image blocks of the pedestrian area according to the extraction method of the image block features of the aligned local descriptor;

7. Dividing obtained image blocks of the pedestrian area into 3 levels. Image blocks of Level 1 are the whole person (that is, all image blocks), image blocks of Level 2 are according to the head, the upper body and the lower body, and image blocks of Level 3 are divided into three blocks according to the importance of the upper body of human body.

In this embodiment, image blocks of Level 1 are all image blocks of the pedestrian area; image blocks of Level 2 are of the head area, the upper body and the lower body area according to the position in the vertical direction, where the number of lines is less than or equal to 15 for the head area, the number is greater than or equal to 60 for the lower body region, and the middle is the upper body region; image blocks of Level 3 are divided into three blocks according to the vertical position of the upper body, and the boundary condition is as follows: Image blocks between Line 15 and 30 belong to a region, those between Line 30 and 45 belong to a region, and those between Line 15 and 60 belong to a region. The average pooling operation is performed on image block features in different levels, and seven eigenvectors are obtained respectively, and then connected together as the final graded global feature; and 8. Finally, by taking XQDA as the metric learning method, calculating the similarity between the two images by Equation 4. The smaller the value is, the smaller the distance between the features is, and the more similar the two images are:

$$d(x,z)=d_W(x_{F_{AL}}, z_{F_{AL}})+\beta \times d_W(x_{F_{HG}}, z_{F_{HG}}) \quad (4)$$

where $d(x,z)$ refers to the distance between two images (x and z). The smaller the value is, the more similar the images are; and $d_W(f_1,f_2)$ is the XQDA distance function, and $x_{F_{AL}}$ and $x_{F_{HG}}$ are the aligned local descriptor and the graded global feature of the image x, respectively, where $\beta$ represents the weight of the global feature, and $\beta=1.3$.

In the embodiment of the present invention, the method of the present invention is compared with other existing methods to verify the effectiveness of the method of the present invention. In Table 1 and Table 2, LOMO (Local Maximum Occurrence) is described in literature (S. Liao, Y. Hu, X. Zhu, and S. Z. Li, Person re-identification by local maximal occurrence representation and metric learning," in Computer Vision and Pattern Recognition (CVPR), 2015, pp. 2197-2206.). SCNCD (Salient Color Names based Color Descriptor) is described in literature (Y. Yang, Salient color names for person re-identification," in European Conference on Computer Vision (ECCV), 2014, pp. 536-551.). kBiCov (Covariance descriptor based on bio-inspired features) is described in literature (B. Ma, Y. Su, and F. Jurie, Covariance descriptor based on bio-inspired features for person re-identification and face verification," Image & Vision Computing, vol. 32, no. 6-7, pp. 379-390, 2014.). LDFV (Local descriptors encoded by fisher vectors) is described in literature (B. Ma, Y. Su, and F. Jurie, Local descriptors encoded by fisher vectors for person re-recognition," in European Conference on Computer Vision (ECCV), 2012, pp. 413-422.). SCSP (Spatially Constrained Similarity function on Polynomial feature map) is described in literature (D. Chen, Z. Yuan, B. Chen, and N. Zheng, Similarity learning with spatial constraints for person re-identification," in Computer Vision and Pattern Recognition (CVPR), 2016, pp. 1268-1277.). DR-KISS (dual-regularized kiss) is described in literature (D. Tao, Y. Guo, M. Song, and Y. Li, Person re-recognition by dual-regularized kiss metric learning," IEEE Transactions on Image Processing, vol. 25, no. 6, pp. 2726-2738, 2016). SSDAL (semi-supervised deep attribute learning) is described in literature (C. Su, S. Zhang, J. Xing, W. Gao, and Q. Tian, Deep attributes driven multi-camera person re-identification," in European Conference on Computer Vision (ECCV), 2016, pp. 475-491.). NLML (Nonlinear local metric learning) is described in literature (S. Huang, J. Lu, J. Zhou, and A. K. Jain, Nonlinear local metric learning for person re-identification," arXiv preprint arXiv:1511.05169v1, 2015.). LOMO (Local Maximum Occurrence) is described in literature (S. Liao, Y. Hu, X. Zhu, and S. Z. Li, \Person re-identi_cation by local maximal occurrence representation and metric learning," in Computer Vision and Pattern Recognition (CVPR), 2015, pp. 2197-2206.).

Figure 3:
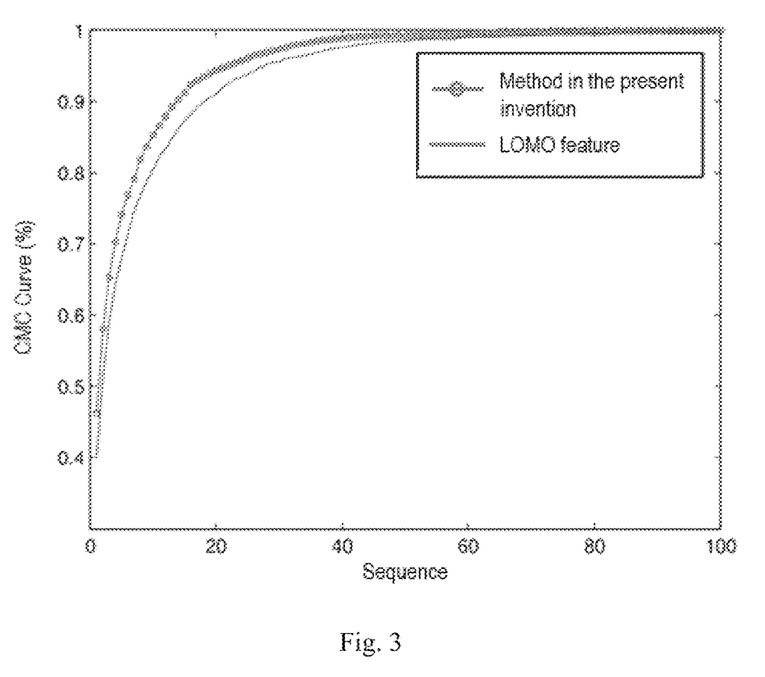
FIG. 3 shows comparison of the matching effect with LOMO feature on VIPeR data set in the embodiment of the present invention.
Figure 4:
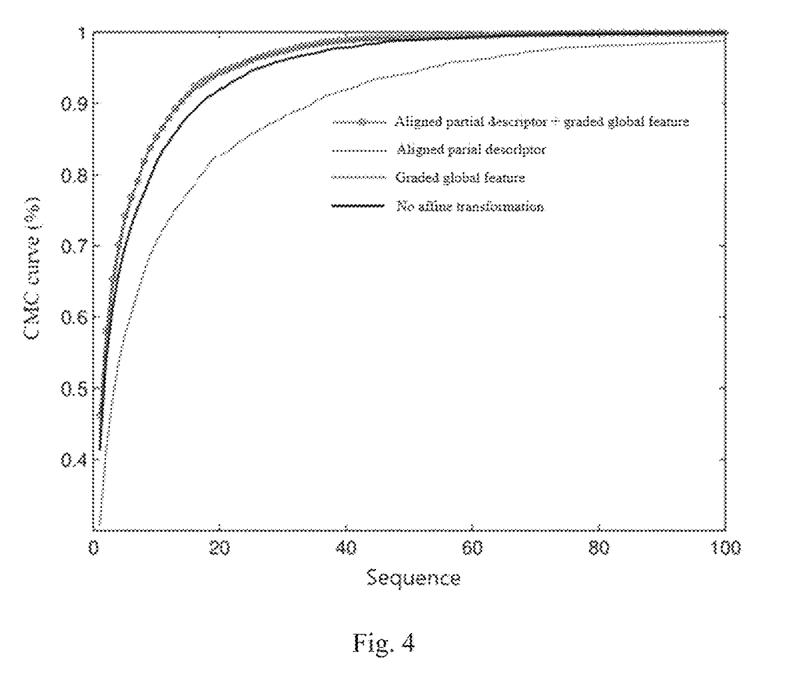
FIG. 4 shows CMC result on VIPeR data set in the embodiment of the present invention.
Figure 5:
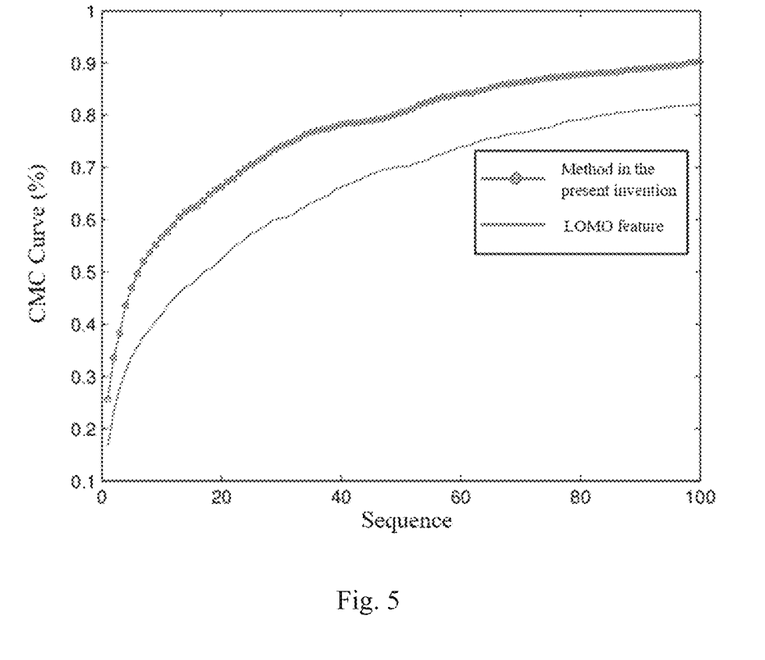
FIG. 5 shows comparison of the matching effect with LOMO feature on QMUL GRID data set in the embodiment of the present invention.
Figure 6:
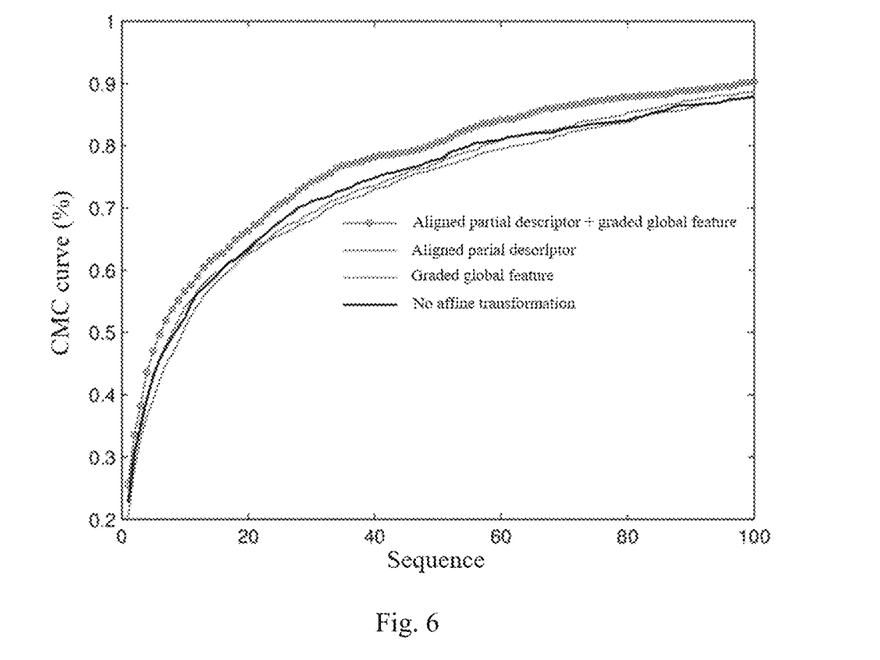
FIG. 6 shows CMC result on QMUL GRID data set in the embodiment of the present invention.

FIG. 3 and FIG. 5 compare the performance of the method proposed in the present prevention and the LOMO feature on the VIPeR and QMUL GRID data sets, respectively. It can be seen that our methods have achieved good results. FIG. 4 and FIG. 6 show the contrast experiments in different cases by using method proposed in the present prevention, including the following methods: the complete method using the combined aligned local descriptor and graded global feature, the method only using the aligned local descriptor as features, the method only using the graded global feature as features and the method combining aligned local descriptor and graded global feature without affine transformation. The results show the different representations of aligned local descriptor and global features on different data sets, and the combined effects are the most excellent, indicating the effectiveness of the method proposed in the present invention.

TABLE 1

CMC results of method in the present invention and existing methods on VIPeR data

| Method | Rank = 1 | Rank = 10 | Rank = 20 | Reference |
| --- | --- | --- | --- | --- |
| Method of the present invention | 46.2 | 85.3 | 94.4 | / |
| LOMO | 40.0 | 80.5 | 91.1 | CVPR 2015 |
| SCNCD | 37.8 | 81.2 | 90.4 | ECCV 2014 |
| kBiCov | 31.1 | 70.7 | 82.5 | IVC 2014 |
| LDFV | 26.5 | 70.9 | 84.6 | ECCVW 2012 |

TABLE 2

CMC results of method in the present invention and existing methods on QMUL GRID data

| Method | Rank = 1 | Rank = 5 | Rank = 10 | Rank = 20 | Reference |
| --- | --- | --- | --- | --- | --- |
| Method of the present invention | 25.6 | 47.0 | 56.6 | 66.3 | / |
| SCSP | 24.2 | 44.6 | 54.1 | 65.2 | CVPR 2016 |
| DR-KISS | 20.6 | 39.3 | 51.4 | 62.6 | TIP 2016 |
| SSDAL | 22.4 | 39.2 | 48.0 | 58.4 | ECCV 2016 |
| NLML | 24.5 | 35.9 | 43.5 | 55.3 | arXiv 2015 |
| LOMO | 16.6 | 33.8 | 41.8 | 52.4 | CVPR 2015 |

Table 1 lists CMC (Cumulative Match Characteristic) results of other methods on VIPeR data. In contrast, the recognition performance of the method of the present invention is improved. Table 1 lists CMC results of other methods on QMUL GRID data. In contrast, the method of the present invention has the highest precision, indicating the effectiveness of the method of the present invention.

It is to be noted that the above contents are further detailed description of the present invention in connection with the disclosed embodiments. The invention is not limited to the embodiments referred to, but may be varied and modified by those skilled in the field without departing from the conception and scope of the present invention. The claimed scope of the present invention should be defined by the scope of the claims.

What is claimed is:

1. An image feature extraction method for person re-identification, comprising:

performing person re-identification by means of aligned local descriptor extraction and graded global feature extraction;

performing the aligned local descriptor extraction by processing an image by affine transformation and performing a summation pooling operation on image block features of adjacent regions to obtain an aligned local descriptor;

reserving spatial information between inner blocks of the image for the aligned local descriptor; and performing the graded global feature extraction by grading a positioned pedestrian region block and solving a corresponding feature mean value to obtain a global feature;

the method further comprising:

1) pre-processing the image to eliminate the effect of illumination on the image;

2) extracting the aligned local descriptor, comprising:
   21) performing affine transformation on the image to obtain multiple images;
   22) performing image block segmentation on all images generated after affine transformation, extracting features, and generating corresponding feature vector maps;
   23) superimposing all the feature vector maps in space, performing a summation pooling operation on the image block features of the adjacent positions, and obtaining corresponding local descriptors; and
   24) connecting all local descriptors in the image in order to obtain an aligned local descriptor;

3) extracting graded global feature, comprising:
   31) using the foreground extraction method to perform significance detection on the image to obtain a corresponding significance image;
   32) enhancing the contrast of significance image obtained;
   33) locating image blocks of the pedestrian area;
   34) classifying the image blocks of the pedestrian area to obtain multi-level image blocks of pedestrian area;
   35) performing an average pooling operation on each level of the image blocks of the pedestrian area to obtain the feature of the level; and
   36) connecting features of multi levels and obtaining graded global feature; and 4) calculating similarity of the images according to the aligned local descriptor extracted in Step 2) and the graded global feature extracted in Step 3) by using the metric learning method, thereby performing person re-identification.

2. An image feature extraction method according to claim 1, wherein in Step 1), the image is preprocessed by using a multi-scale Retinex algorithm.

3. An image feature extraction method according to claim 1, wherein in Step 21), an affine transformation is performed on the image, the method further comprising:

horizontally flipping a preprocessed image I to obtain image II; performing horizontal shear transformation on image I and image II respectively to generate corresponding image III and IV; and the horizontal shear transformation is as shown in Equation 1:

$$\begin{bmatrix} x' \\ y' \\ 1 \end{bmatrix} = \begin{bmatrix} 1 & 0 & 0 \\ \lambda & 1 & 0 \\ 0 & 0 & 1 \end{bmatrix} \begin{bmatrix} x \\ y \\ 1 \end{bmatrix} \quad (1)$$

where $\lambda$ is a shear transformation parameter.

4. An image feature extraction method according to claim 1, wherein in Step 22), the sliding window method is used to obtain the image block features, and specifically extracting an RGB color histogram, an HSV color histogram, and statistical histogram of Scale-Invariant Local Three-valued Pattern (SILTP) for image blocks in the window, to obtain multiple feature vector maps, wherein each feature map has M*N points, and each point corresponds to the feature vector of one image block, denoted as $F^i_{m,n}$.

5. An image feature extraction method according to claim 1, wherein in Step 23), the four feature vector maps are superimposed by Equation 2, a summation pooling operation is performed on image block features of adjacent positions, and the corresponding local descriptor is obtained:

$$\widetilde{F_{p,q}} = \sum_{i=1}^{4}(F^i_{m,n} + F^i_{m+1,n} + F^i_{m,n+1} + F^i_{m+1,n+1}) \quad (2)$$

where:

$$m = 2\times(p-1)+1, n = 2\times(q-1)+1, p \leq \left\lfloor\frac{M}{2}\right\rfloor, q \leq \left\lfloor\frac{N}{2}\right\rfloor,$$

where $F_{m,n}^i$ denotes image block feature vectors of the $m^{th}$ row and the $n^{th}$ column in an $i^{th}$ feature map, adjacent image block feature vectors are added, and $\widetilde{F_{p,q}}$ obtained denotes a local descriptor, where p and q are positive integers, respectively representing the location of the local descriptor.

6. An image feature extraction method according to claim 1, wherein in Step 31), a cellular automata method is used to perform foreground extraction on the preprocessed image to obtain a corresponding significance image.

7. An image feature extraction method according to claim 1, wherein in Step 32), the contrast of extracted significance images is enhanced by using Equation 3:

$$P'_{r,i} = \frac{(P_{r,i})\times 255}{\max(Pr, i=1,2\ldots n) - \min(Pr, i=1,2\ldots n)} \quad (3)$$

where the numerator $p_{r,i}$ is an element value of an $i^{th}$ column of a $r^{th}$ row, and the denominator is the extreme difference of the element of the row, wherein after obtaining the $p'_{r,i}$ value of element of each column of the row, the elements of the row are uniformly updated.

8. An image feature extraction method according to claim 1, wherein in Step 33), image blocks of the pedestrian area are located, first the OTSU algorithm is adopted to adaptively select a threshold, and binarization is performed on the result image obtained by the contrast enhancement, to obtain the corresponding binary image; the binary image is scanned by the sliding window method to sum the element values in the window; and by setting the threshold, the window larger than the set threshold is defined as a pedestrian area, and others are unrelated areas.

9. An image feature extraction method according to claim 1, wherein in Step 34), image blocks of the pedestrian area are divided into three levels to obtain three levels of pedestrian area image blocks, wherein a first level corresponds to all image blocks of the pedestrian area, wherein a second level corresponds to image blocks of the head area, the upper body and the lower body area according to the position in the vertical direction of image blocks, wherein a third level is further divided into three areas according to the vertical position of image blocks of the upper body.

10. An image feature extraction method according to claim 1, wherein in Step 4), XQDA is used as a metric learning method to calculate image similarity, and the similarity between the two images is calculated by Equation 4:

$$d(x,z) = d_W(x_{F_{AL}}, z_{F_{AL}}) + \beta \times d_W(x_{F_{HG}}, z_{F_{HG}}) \quad (4)$$

where $d(x,z)$ refers to the distance between two images (x and z), wherein the smaller the value is, the more similar the images are; $d_W(f_1,f_2)$ is the XQDA distance function; $x_{F_{AL}}$ and $x_{F_{HG}}$ are the aligned local descriptor and the graded global feature of Image x respectively, wherein $\beta$ represents the weight of the global feature.

* * * * *